Feb. 7, 1928.

F. J. MacDONALD 1,658,566

METHOD AND APPARATUS FOR MOLDING ARTICLES

Original Filed May 19, 1924    3 Sheets-Sheet 1

Inventor.
Frank J. MacDonald.
By Robert McPherson Atty

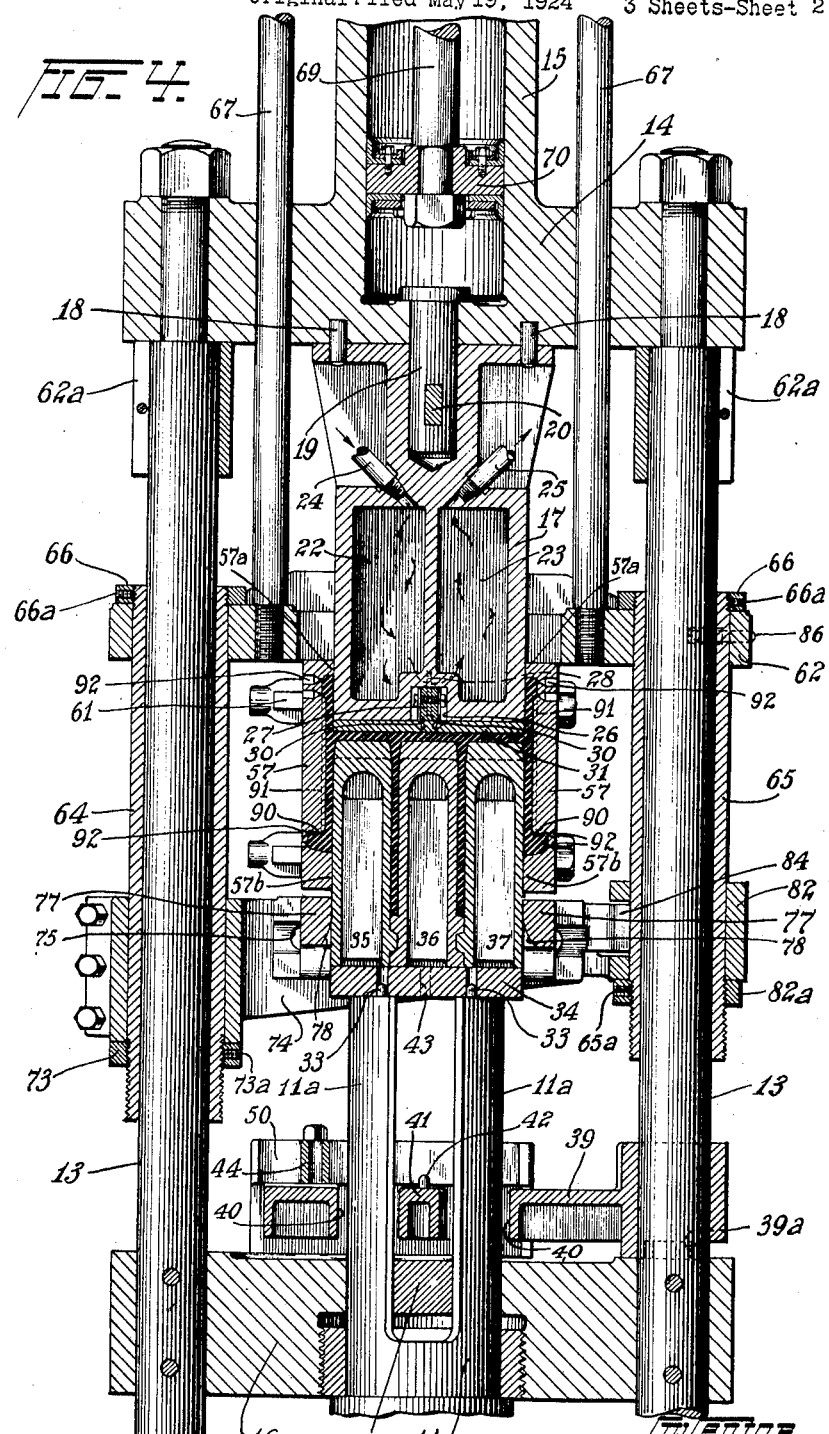

Feb. 7, 1928.
F. J. MacDONALD
1,658,566
METHOD AND APPARATUS FOR MOLDING ARTICLES
Original Filed May 19, 1924   3 Sheets-Sheet 3
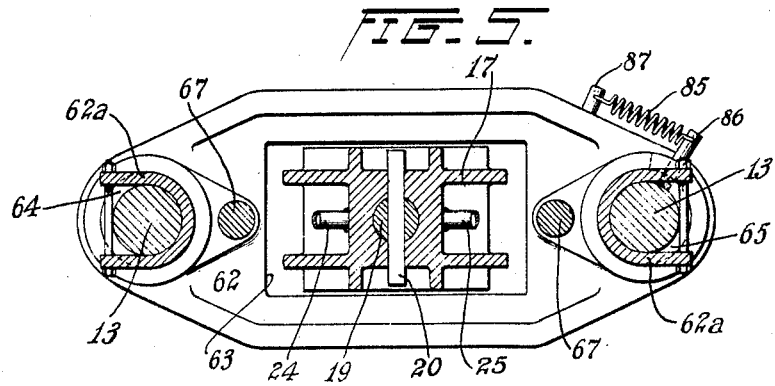
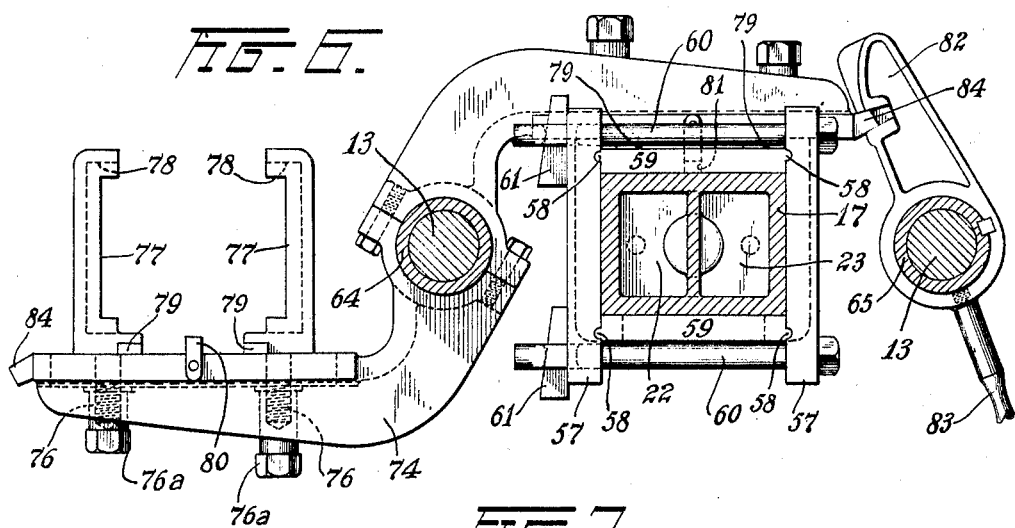
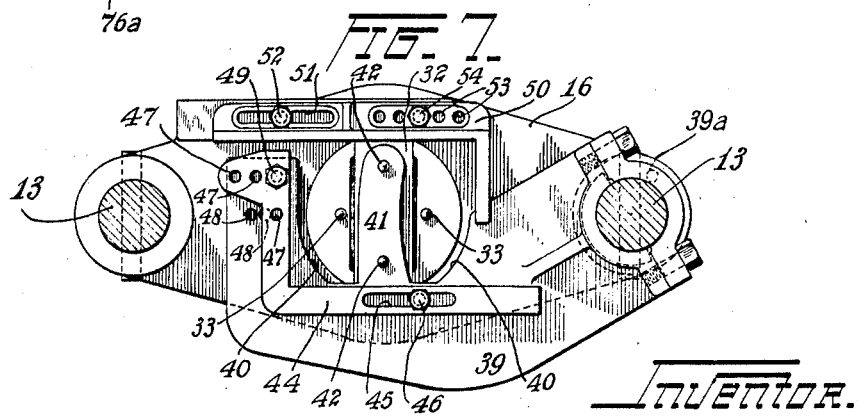
INVENTOR.
Frank J. MacDonald.
By Robert McPherson
Atty.

Patented Feb. 7, 1928.

1,658,566

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR MOLDING ARTICLES.

Application filed May 19, 1924, Serial No. 714,287. Renewed August 24, 1927.

This invention relates to the art of molding hollow articles or containers such as battery jars, for example, from plastic material such as a vulcanizable rubber compound, the present invention being in some features an improvement upon those of my following copending applications: Serial No. 697,009, filed March 5, 1924; Serial No. 704,503, filed April 5, 1924; and Serial No. 713,077 filed May 13, 1924.

The chief object of my present invention is to provide improved and economical procedure and apparatus for molding containers such as battery jars, and more particularly multiple celled jars, and jars of uneven external surface. More specifically, an object is economically, accurately and rapidly to form such containers without elaborate manipulation in the assembling of the pieces of stock from which the jar is molded. A further object is to provide for conveniently vulcanizing the container in the shaping members in which it is molded and thereafter removing said members, and more particularly in the case of a container having undercut handles integral with its walls.

Referring to the drawings:

Fig. 4 is a fragmentary vertical section of the apparatus from the same view point as in Fig. 1.

Fig. 5 is a horizontal section on line 5—5 of Fig. 1.

Fig. 6 is a horizontal section on line 6—6 of Fig. 1.

Fig. 7 is a horizontal section on line 7—7 of Fig. 1.

Figure 1:
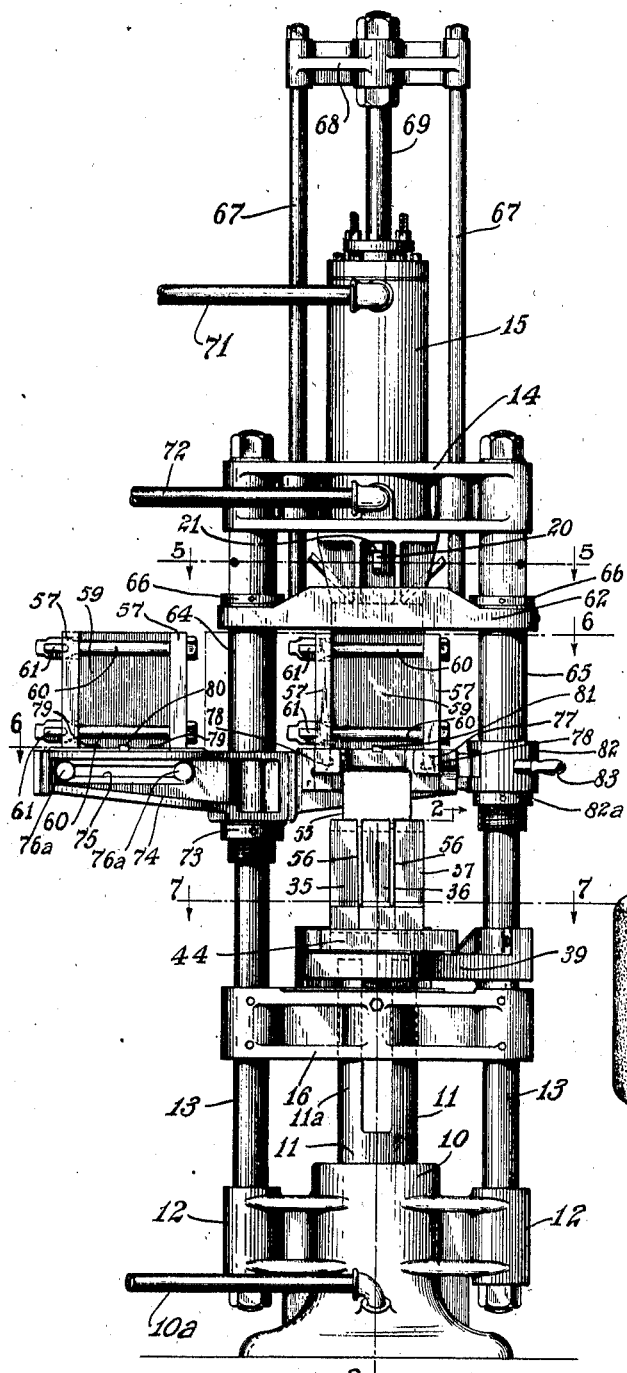
Fig. 1 is an elevation of apparatus embodying and adapted to carry out my invention as applied to the molding of battery jars.
Figure 2:
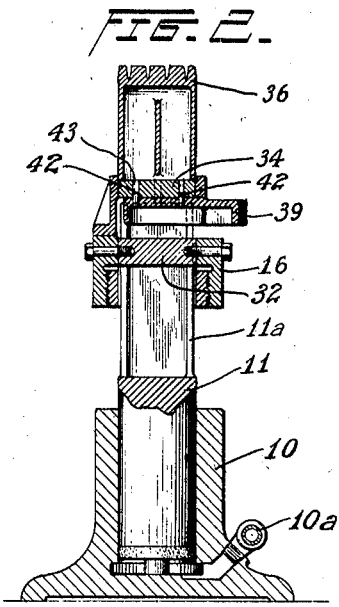
Fig. 2 is a section of certain parts thereof, on line 2—2 of Fig. 1.

Referring to the drawings, the apparatus comprises a base casting centrally formed as a fluid pressure cylinder 10, said cylinder having an upwardly projecting, mandrel-supporting ram 11 therein, and being provided with an inlet-outlet pipe 10ᵃ at its lower end. Integral brackets 12, 12 are formed on two opposite sides of the casting, and secured in the respective brackets are two frame posts 13, 13, which are connected at their tops by a casting 14 comprising a cross-beam portion 14 and a central, upstanding fluid-pressure cylinder 15 integral therewith. The frame posts are also connected at a lower position by an apertured, ram-guiding, cross-beam member 16.

Detachably secured to the under side of the cross-beam 14 is a hollow bottom-pressing member 17, dowels 18, 18 being interposed between the two, and the member 17 being supported by a cotter bolt 19 driven through an aperture in the floor of the cylinder 15, to provide a fluid tight fit, its lower end extending into a bore in the bottom-pressing member 17, and the bolt and the member 17 being transversely apertured for a cotter pin or wedge key 20 which bears against lugs such as is shown at 21, Fig. 1, formed on the member 17, to support the latter.

The bottom pressing member in its lower portion is formed with vertical external faces, in horizontal section is slightly smaller than the external bottom face of the jar, and is formed with two steam chambers 22, 23, which are in communication with each other at their lower ends as indicated by the arrow in Fig. 4, the chamber 22 being provided with an inlet pipe 24 and the chamber 23 with an outlet pipe 25 for circulating a heating fluid such as steam through them.

A recess 26 is formed in the bottom face of the member 17, and in said recess is a block 27 secured to the member 17 by screw bolts such as 28 and formed with vertical grooves in which are secured, by a bolt passing through the block, a pair of spring clamps 30, 30 adapted to latch in position against the bottom of the member 17 a bottom-pressing plate 31 having undercut recesses to receive said clamps, said bottom-pressing plate having its vertical or edge faces flush with the vertical faces of the member 17.

The mandrel-supporting ram, 11, is slotted from its upper end to provide a pair of forks 11ᵃ, 11ᵃ; which straddle and are guided by a cross-piece 32 bridging the aperture in the cross-beam 16 through which the ram slides. The upper end faces of the forks 11ᵃ of the ram are provided with respective dowels, 33, 33 for positioning thereon a mandrel-supporting plate 34 (Fig. 4) carrying three hollowed mandrels 35, 36, 37 adapted to mold the respective cells of a three celled battery jar, said mandrels being so formed as to interfit at their bases and stand apart in their upper, molding portions to provide space for the partitions 38, 38 of the jar.

For bringing successive mandrel-supporting plates, with mandrels thereon, into position to be engaged and raised by the ascending ram, a horizontally-swinging arm or table 39 is pivoted on one of the frame posts 13, its hub bearing upon the cross-beam 16. Said table is recessed at one side, at 40, 40, to admit the respective forks 11ª of the ram as the latter rises to lift the mandrel assembly from said table, and the part of said table lying between the recesses 40 constitutes a tongue 41, the upper face of which is provided with dowels 42, 42 adapted to occupy holes such as 43 in the mandrel-supporting plate 34, Fig. 4, to position said plate for the reception of the dowels 33, 33 of the ram, the table 39 being adapted to be stopped in its swinging movement in one direction by abutting against the forks of the ram, and in the other direction by a stop 39ª on the post 13.

The apparatus as here shown is adapted for use with mandrels of only one dimension lengthwise of the jar's partitions, but the table 39 is provided with mandrel-positioning means which may be adjusted for mandrels of different length transversely of the partitions. Said means comprises an L-shaped gauge 44, one arm of which is formed with a slot 45 occupied by a clamping bolt 46 rising from the table, and the other arm of the gauge is formed with a number of bolt holes 47, 47 which may be selectively registered with appropriately positioned bolt holes such as 48, 48 in the table, for securing the gauge in different positions transversely of the mandrels, by means of a bolt 49 occupying the registered bolt holes. The cross-beam 16 is similarly provided with an L-shaped gauge 50 which is formed with a slot 51 occupied by a clamping bolt 52 rising from said cross-beam, and said gauge is also formed with a series of bolt holes 53, 53 which may be selectively registered with apertures in the cross-beam, for securing the gauge 50 in different positions transversely of the mandrels, by means of a bolt 54 occupying the registered bolt holes. The gauges 44 and 50 are thus adapted to cause the mandrels to fit snugly together and to position them upon the plate 34 when the table 39, with the plate and mandrels thereon, is swung into delivering position against the forks of the ram 11.

Means are provided for telescoping a sectional, through-cavity mold, from below, with the bottom-pressing plate 31 and member 17, and then moving said mold downward with the flowing stock as a mass of rubber compound 55, Fig. 1, is pressed between the mandrels and the plate 31 and thus caused to flow into the space between the mandrels and the mold, partition sheets of stock 56, 56, Fig. 1, preferably being mounted in the spaces between the mandrels beforehand, to be joined to the stock 55 during this operation.

The sectional mold comprises two opposite side plates 57, 57 formed with vertical grooves on their adjacent faces to receive tongues 58, 58 formed on the edge faces of interposed side plates 59, 59, (Fig. 6), the first pair of plates being clamped upon the second pair by cotter bolts 60, 60 mounted in the projecting margins of the plates 57 and provided with cotters or wedge-keys 61, 61. All of the mold plates are formed with internal flanges such as 57ª, 57ª (Fig. 4) at the top and with similar flanges such as 57ᵇ, 57ᵇ at the bottom, to fit against the bottom-pressing member 17 and the mandrel assembly respectively to prevent escape of stock.

For manipulating the successive molds, a cross-head 62, formed with a rectangular central aperture 63 (Fig. 5) to accommodate the bottom-pressing member 17, but adapted to bear upon the ends of the mold plates 57, is formed with apertured end portions or ears which are occupied, with a sliding fit, by respective sleeves 64, 65, slidably mounted upon the frame posts 13, the upper ends of said sleeves having secured thereon, by set screws 66ª, 66ª respective threaded collars 66, 66 adapted to be adjusted to hold said sleeves at different elevations with respect to said cross-head. The latter is adapted to be raised and lowered by a pair of supporting bars 67, 67 connecting it with a yoke 68 mounted upon the upper end of a piston rod 69 rising from the cylinder 15 and provided with a piston 70 therein, said cylinder being provided with pressure fluid pipes 71, 72 for actuating said piston in both directions. 62ª, 62ª are stop collars clamped upon the frame posts 13 to limit the upward movement of the cross-head 62.

Pivoted upon the sleeve 64 and adjustably supported by a threaded collar 73 on the lower end of said sleeve is a two-armed turret 74, each arm of which is formed with a horizontal slot, as at 75, Fig. 1, and in said slot are adjustably mounted the threaded stems 76, 76 of a pair of horizontal, mold-supporting brackets 77, 77, said threaded stems being provided with cap-nuts 76ª, 76ª. Said brackets are so formed and so spaced apart as to support the mold while permitting the passage of the mandrels upward thereinto, the mandrels passing between said arms, and the latter are formed with rounded lower, inner corners, as shown at 78, 78, to center the mandrels and hold them together as they pass upward between said brackets, into the mold. Each of the brackets is formed with a lug 79 and the turret arm has secured thereon a gauge plate 80 adapted to occupy a complemental recess such as 81, Fig. 6, with which each of the mold plates 59 is formed, to position the mold upon said brackets.

The turret 74 is adapted to be turned on the sleeve 64 and collar 73, the latter being provided with a set screw 73ª to prevent its rotation, to bring successive molds into position below the bottom-pressing member, 17, when the ram 11 and the turret are in their lowermost positions, so that the mold may be raised into telescoped relation to said bottom-pressing member when the cross-head 62 is elevated by the cylinder 15. For stopping the turret in such position and preventing its unintended rotation therefrom, a cam latch 82, supported by a collar 82ª screwed upon the sleeve 65 and provided with a set screw 65ª, is keyed upon the sleeve 65, is provided with a handle 83, and is adapted to coact with latching projections 84, 84 on the respective arms of the turret, under the force of a pull spring 85, Fig. 5, connecting a stud 86 on the sleeve 15 with a stud 87 on the cross-head 62.

Figure 3:
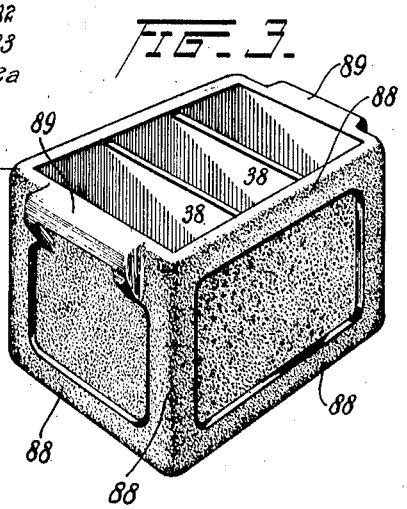
Fig. 3 is a perspective view of the finished battery jar.

The sectional mold here shown is adapted to shape a battery jar having externally ribbed or reinforced corners or margins as shown at 88, 88, Fig. 3, and with integral handles 89, 89 at the ends of the jar, the mold plates 57 being formed with undercut recesses 90, 90, Fig. 4, to form said handles, and all of the mold plates being formed with suitable recesses as at 91, 91, Fig. 4, to mold the ribs 88. 92, 92 are vents for such recesses, to prevent the entrapping of air in the molding process.

In the operation of the apparatus, the ram 11 and the assembly which includes the cross-head 62 and turret 74 being in their lowermost positions, as they are at the end of each molding operation, and the table 39 being turned out of the way, an empty mold is mounted upon the outer arm of the turret and the latter is turned to bring said mold under the bottom-pressing member 17, and to carry away the preceding mold, with a molded jar and the mandrels therein, for removal at the loading and unloading position. The cylinder 15 is then actuated to lift the empty mold and telescope it with the bottom-pressing member, as shown in Fig. 1.

A set of mandrels is then mounted upon the plate 34 on the table 39, against the gauge 44, the partition blanks being inserted between the mandrels, and said table is turned to bring the plate 34 and the mandrels thereon into position over the ram 11, the mandrels being accurately positioned by the coaction of the gauges 44 and 50. The block of rubber stock 55, at a suitable temperature, is then mounted upon the mandrels as shown in Fig. 1, and the cylinder 10 is actuated to raise the ram 11, which picks up the mandrel assembly as it ascends, and presses the stock between said mandrels and the plate 31 on the bottom-pressing member 17, within the lower end of the mold, whose lower margin clearly fits the set of mandrels. The mass of stock is thus caused to coalesce with the partition stock 56 and to take the shape of the space defined by the mandrels, the mold and the plate 31.

The cylinder 15 is then actuated to lower the mold, while the stock is compressed by the yielding force of the ram 11, which causes the stock to flow directly from the mass into the handle recesses 90 and to continue to flow into the space between the mandrels and the mold as the latter continues to descend. The downward movement of the mold, along with the growing wall of stock, results in less friction in the stock and against the mold than would be present in molding a similarly shaped article in a one-piece mold, and thus permits the necessary flow of stock without such high pressure therein as to cause displacement of the mandrels with relation to the mold, or require great force to flow the stock the length of the mandrels.

In the particular apparatus here shown, adapted for making an article having thick wall portions, the stock may be forced upward, toward and into the recesses 91, before the upper part of the mold has descended to the level of the unformed mass of stock, as in the condition shown in Fig. 4, but this does not nullify the advantage of effecting movement of the mold in the direction of the general and ultimate flow of the side wall stock. Only such upward flow will occur as is commensurate with the relatively light pressure necessary to be maintained upon the unformed mass, and such stock as flows upward is subsequently brought back down to its ultimate position by the continued downward movement of the mold.

The bottom-pressing member is preferably kept heated, by means of the pipes 24, 25, and the mandrels and molds are preferably used while they are still warm from a preceding vulcanizing operation. I find in practice that the best results are obtained when the stock and shaping members are at such temperature that the stock adheres to the shaping members and extends itself by internal flow, its cohesive properties being weaker than its adhesion to the shaping members. The sheets of partition stock, between the mandrels are preferably at not such high temperature as to be extended from between the mandrels by the pressure in the mass of stock 55. An advantage of my invention is that the jar may be formed without the high pressure, such as to displace or extrude the partition sheets, which would be required to form the jar in an ordinary plunger-mold operation.

While the vents 92 may be dispensed with as to molds of but slightly uneven surface, I prefer to employ them where the recesses to be filled are deep, as in the molds here shown.

When the mold has been moved downward to its final position upon the mandrels, the ram 11, with the mandrel-supporting plate 34 thereon, is allowed to descend of its own weight, by exhausting the cylinder 10, leaving the mold, with the work and the mandrels therein, supported by the turret 74, the mold and work leaving the bottom-pressing member 17 and descending onto the turret as the ram is withdrawn. The bottom-pressing plate 31 may adhere to the work by suction and thus be detached from the spring clamps 30, or it may be so detached by hand, to be used as a mold member in the vulcanization of the jar.

The mold assembly, with the work therein, is then removed and put through the vulcanizing operation, and the molding operation as described is repeated. The mold, being made in the four sections, may readily be removed from the battery jar after vulcanization, nothwithstanding the undercut form of the handle-molding recesses.

The apparatus is adapted for the rapid forming of jars in association with vulcanizing molds and mandrels, but little preforming of the stock is required, good cohesion of the stock is obtained without requiring extremely high pressure, and the jars are molded accurately to form.

An advantage of employing yielding means such as the fluid pressure cylinder 15 for driving the mold is that the pressure on the mold and on the mandrels readily may be so correlated as to conform to the plastic characteristics of the stock and avoid such rapid movement of the mold, for example, as would result in unduly attenuating or tearing the growing wall of stock. This advantage is of especial importance where, as here, the mold is formed with a recessed surface interlocking with the stock.

Modifications may be resorted to without departing from the scope of my invention, and I do not wholly limit my claims to the specific procedure or apparatus described.

I claim:

1. The method of shaping a cellular article of plastic material which comprises assembling a partition forming sheet of stock between mandrel members and flowing an unformed mass of stock, by pressing it against the mandrel assembly, into the form of a coating upon the latter, and so joining said coating with said partition forming sheet.

2. The method of shaping a cellular article of plastic material which comprises assembling a partition forming sheet of stock between mandrel members and applying a coating of stock to the mandrel assembly by pressing a mass of stock thereagainst, and moving a shaping member along with and holding it against the flowing stock as the latter extends itself upon the surface of the mandrel assembly.

3. The method of shaping an article of plastic material which comprises applying a coating of plastic stock to a shaping structure by pressing a mass of stock thereagainst while moving a shaping member of recessed surface along with and pressing it against the flowing stock as the latter extends itself upon the surface of said shaping structure, and venting the recessed surface of said shaping member through said member.

4. Apparatus for shaping plastic material, said apparatus comprising a set of at least three rigid shaping members substantially enclosing a stock-receiving space and adapted for relative movement to effect a radical change of the shape of said space to that of the article to be formed, one of said members being movable along with, and at approximately the same speed as that of, the flowing stock adjacent thereto, and fluid-circulating means for heating a mass of stock in said stock-receiving space during the described relative movement of the said members.

5. Apparatus for shaping a cellular article of plastic material, said apparatus comprising a mandrel structure having a partition-molding recess, means for pressing a mass of stock against said mandrel structure to flow the stock thereabout, and a shaping member relatively movable along said pressing means and said mandrel structure and adapted therewith to press the stock while so moved.

6. Apparatus for shaping an article of plastic material, said apparatus comprising a shaping member, means for pressing a mass of stock against said shaping member to flow it into the form of a layer thereon, and a shaping member relatively movable along said pressing means and the first said shaping member and adapted therewith to press the stock while so moved, one of said shaping members being formed with a recessed shaping surface and with a vent aperture therethrough at its recessed portion.

7. Apparatus for shaping an article of plastic material, said apparatus comprising a shaping member formed with a recessed shaping surface and with a vent aperture at its recessed portion, and means for so compressing a mass of stock and relatively moving it along said shaping surface as to cause the stock to be given off and pressed against the latter.

8. Apparatus for shaping an article of plastic material, said apparatus comprising a recessed shaping member, a pair of pressing members for so compressing a mass of stock in contact with said shaping member as to cause the stock to be given off as a layer upon said shaping member as the latter is relatively moved past said pressing members, and yielding means for so moving said shaping member with relation to both of said pressing members.

9. Apparatus for shaping an article of plastic material, said apparatus comprising a shaping member, a pair of pressing members for so compressing a mass of stock in contact with said shaping member as to cause the stock to be given off as a layer upon said shaping member as the latter is relatively moved past said pressing members, and yielding means for so moving said shaping member with relation to both of said pressing members.

10. Apparatus for shaping an article of plastic material, said apparatus comprising a sectional female shaping structure, a pair of opposed, male, stock-pressing members telescoped within said female member, said female member being adapted for axial movement with relation to both of said male members during the shaping operation, and means for circulating a heating fluid in one of said male members.

11. Apparatus for shaping an article of plastic material, said apparatus comprising a female shaping structure, and a pair of opposed, male, stock-pressing members telescoped within said female structure, the latter being axially movable with relation to both of said male members and comprising separable sections, at least one of said sections being formed with an under cut recess in its shaping surface of such form as to permit the removal of the section from the finished work.

12. Apparatus for shaping an article of plastic material, said apparatus comprising a female, through-apertured, shaping structure having internal, circumferential flanges, adjacent its ends, and a pair of opposed, male, stock-pressing members telescoped within said female structure and slidably fitting said flanges, said female structure being axially movable with relation to both of said male members.

13. Apparatus for shaping an article of plastic material, said apparatus comprising a downwardly projecting, male, stock-pressing structure, a second male, stock-pressing structure adapted to be opposed to the first said structure from below to press a mass of stock between the two, and to be lowered therefrom, a separate, unattached, female shaping structure adapted to be moved in telescoped relation to the two opposed male structures, and supporting means adapted freely to receive and to support said female structure between said male structures when the latter are separated, and to raise said female structure into telescoped relation to the first mentioned male structure.

14. Apparatus as defined in claim 13 in which the supporting means comprises a turret adapted to carry the female shaping member into the space between the separated male members.

15. Apparatus for shaping an article of plastic material, said apparatus comprising a downwardly projecting, male, stock-pressing structure, a vertical plunger below said structure adapted to raise a mandrel toward the latter, a female shaping structure adapted to be moved in telescoped relation to said stock-pressing structure, and means for supporting a mandrel structure in position to be picked up by said plunger structure as the latter rises.

16. Apparatus as defined in claim 15 in which the mandrel supporting structure comprises a pivoted member adapted to carry the mandrel structure into position to be picked up by the plunger.

17. Apparatus for shaping an article of plastic material, said apparatus comprising a downwardly projecting, male, stock-pressing structure, a vertical plunger below said structure adapted to raise a mandrel toward the latter, a female shaping structure adapted to be moved in telescoped relation to said stock-pressing structure, and means for supporting a mandrel structure in position to be picked up by said plunger structure as the latter rises, said mandrel supporting structure comprising a support adapted to be cleared by the rising plunger, and a member adapted to support a plurality of mandrels, to rest on said support, and to be picked up therefrom by said plunger.

18. Apparatus for shaping an article of plastic material, said apparatus comprising a downwardly projecting, male, stock-pressing structure, a vertical plunger below said structure adapted to raise a mandrel toward the latter, a female shaping structure adapted to be moved in telescoped relation to said stock-pressing structure, a pivoted member adapted to carry a mandrel structure into position to be picked up by said plunger as the latter rises, mandrel positioning means on said pivoted support, and fixed mandrel positioning means adapted to cooperate with the positioning means on said pivoted support as the latter is swung to mandrel delivering position, to position the mandrel structure for the operation of said plunger.

19. Apparatus for shaping an article of plastic material, said apparatus comprising a through-apertured, female shaping member, a pair of opposed, male, stock-pressing members within said female member, each of the three members being axially movable with relation to the other two, and a stock-pressing plate detachably secured to the face of one of said male members.

20. Molding apparatus comprising a set of rigid molding members adapted completely to close a stock-receiving space, except as to air-venting spaces, by contact of smooth, rigid surfaces thereof, three members of the set being adapted for relative movement of each with relation to each of the other two during the shaping operation and by such movement radically to change the shape of stock in the said space while maintaining the complete enclosure thereof, except as to air-venting spaces by the said rigid members.

21. The method of making an article from moldable material which comprises completely enclosing a mass of the material, except as to air-venting spaces, with at least three rigid molding members and so moving each of three of said members with relation to each of the other two during the shaping operation as radically to change the shape of the said mass of material while keeping it completely enclosed except as to air-venting spaces by contact of the said rigid molding members with each other.

In witness whereof I have hereunto set my hand this 17th day of May, 1924.

FRANK J. MacDONALD.